United States Patent [19]
Livingston

[11] Patent Number: 6,060,031
[45] Date of Patent: May 9, 2000

[54] METHOD FOR NEUTRALIZING ACID GASES FROM LASER EXHAUST

[75] Inventor: Peter M. Livingston, Palos Verdes Estates, Calif.

[73] Assignee: TRW Inc., Redondo Beach, Calif.

[21] Appl. No.: 09/123,093

[22] Filed: Jul. 27, 1998

[51] Int. Cl.$^7$ .............................. B01D 47/00; C01B 7/00; C01B 7/19; C01B 3/00; C01B 9/00; C01B 9/08
[52] U.S. Cl. ..................... 423/210; 423/240 R; 423/248; 423/462; 423/463; 423/464; 423/465; 423/483; 423/489; 423/490; 423/491; 204/157.15; 204/157.4; 204/157.41; 204/157.48; 372/39; 372/55; 372/59; 95/149
[58] Field of Search .................................. 372/59, 39, 55; 204/157.4, 157.41, 157.15, 157.48; 423/210, 240 R, 489, 490, 491, 463, 462, 464, 483, 248, 465; 95/149

[56] References Cited

U.S. PATENT DOCUMENTS

| | | | |
|---|---|---|---|
| 3,879,680 | 4/1975 | Naismith et al. | 331/94.5 G |
| 4,740,982 | 4/1988 | Hakuta et al. | 372/59 |
| 5,073,896 | 12/1991 | Reid et al. | 372/59 |
| 5,111,473 | 5/1992 | Rebhan et al. | 372/59 |
| 5,243,108 | 9/1993 | Manzer et al. | 570/166 |
| 5,366,156 | 11/1994 | Bauer et al. | 239/135 |

OTHER PUBLICATIONS

Stacey et al., Advances in Fluorine Chemistry, vol. 2, Butterworth & Co. Limited, p. 47, 1961.

Bailar et al., Comprehensive Inorganic Chemistry, Pergamon Press Limited, pp. 1017–1019, 1973.

Primary Examiner—Steven P. Griffin
Assistant Examiner—Eileen E. Nave
Attorney, Agent, or Firm—Michael S. Yatsko

[57] ABSTRACT

The device and method of the invention provide a neutralizing compound that reacts with acid gases generated in laser exhaust to yield an insoluble non-toxic powder.

5 Claims, 2 Drawing Sheets

Fractional Depletion of DF

//6,060,031//

METHOD FOR NEUTRALIZING ACID GASES FROM LASER EXHAUST

BACKGROUND OF THE INVENTION

1. Field of Invention

The present invention relates to a device and a method for the neutralization of acids in laser exhaust gases. More specifically, HF (hydrogen fluoride) and DF (deuterium fluoride) present in laser exhaust gas is neutralized to form an insoluble nontoxic powder.

2. Description of the Prior Art

A serious potential drawback to the deployment of DF/HF chemical laser weapons is its toxic exhaust. By serendipity, the first chemical lasers used steam ejector systems to recover the laser cavity ejecta to atmospheric pressure, and in the process, removed hydrogen or deuterium fluoride (after some calcium hydroxide was added to the counter-flowing coolant spray in the last stage of the ejector). Therefore, the exhaust issue did not seriously impact field installations.

The use of an alternative installation, a MADS laser, has become more common. The MADS laser includes a closed pumping system using active lithium coating a wire grating. However, the system is costly, hot and bulky. Present attempts to scrub out the acid from the flow consist of recirculating a neutralizer spray in the diffuser portion of the pressure recovery system, but this technique is bulky, adds weight and power requirements for the pumps and recirculating neutralizer fluid.

One general approach for removing low-pressure effluent gases containing HF and DF from a chemical laser system is described in U.S. Pat. No. 3,879,680. In this system, a gas-generating composition is burned in a gas generator to produce high-temperature gaseous combustion products containing gaseous alkali metal hydroxides, gaseous alkali metal and mixtures thereof. The combustion products are vented through a restricted nozzle to produce a high velocity gas stream, and are mixed with laser effluent gases to permit the gaseous alkali metal hydroxides and gaseous alkali metals to react with HF and DF. Once again, this system adds significant size and power requirements to the system.

SUMMARY OF THE INVENTION

It is an object of the present invention to provide a device and process for neutralizing acids from the exhaust of DF/HF chemical laser weapons and provide a nontoxic insoluble powder which is easily removable from the system.

It is another object of the present invention to provide a device and process for neutralizing acids from the exhaust of DF/HF chemical laser weapons in which no additional electrical power or pumps are needed and where no sump is required as the neutralized compounds are expendable.

It is yet another object of the invention to provide a device and process for neutralizing acids from the exhaust of DF/HF chemical laser weapons which is easy to retrofit at low cost with commonly available materials, and which adds a small additional volume to the existing system.

In an important aspect, the device and method of the invention are effective for neutralizing at least about 95–99% of the DF and HF present in the laser exhaust gas and for converting these acids into an insoluble nontoxic powder. The device of the present invention includes a reservoir containing a neutralizer, spray heads located in interstitial areas between laser ejector nozzles, and feed tubes extending from the reservoir containing the neutralizer to the spray heads. According to the method of the present invention, neutralizer is injected into the exhaust gases generated by the laser. The neutralizer is injected in an amount effective for reacting with hydrogen fluoride and deuterium fluoride in the effluent gases to form an insoluble powder. The resulting insoluble powder formed by the process of the present invention is considerably less toxic and corrosive than HF or DF and is dissipated as a powder in the exhaust stream.

DESCRIPTION OF THE DRAWINGS

These and other objects of the present invention will be readily understood with reference to the following specification and attached drawing, wherein.

DETAILED DESCRIPTION OF THE INVENTION

Figure 1:
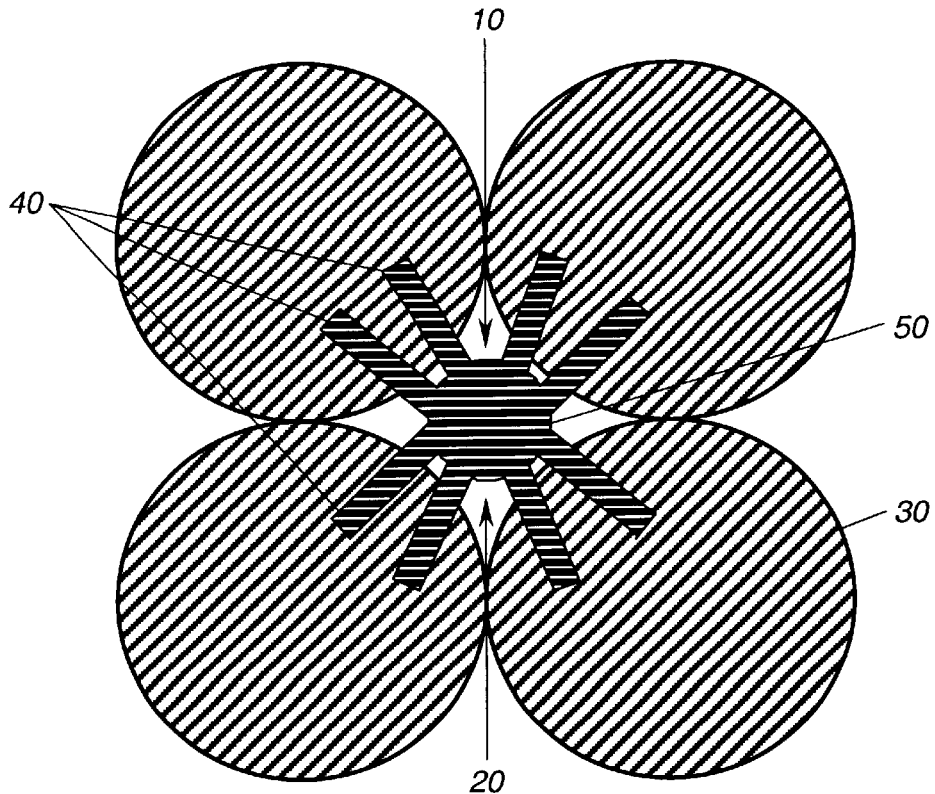
FIG. 1 illustrates an ejector plane showing 4 of twenty ejectors. A similar array of atomizer nozzles exist in each of the twelve interstitial spaces between nozzles.

Briefly, the present invention "titrates" (adds a neutralizer in stoichiometric proportion) the hot gas flow leaving the ejectors effectively removing the toxic acid from the flow. The neutralizer substance, after reacting with the acid forms an insoluble product that is non-toxic and is suspended in the ejector flow field as a very finely-divided powder. The powder, intimately mixed with the exhaust gases, is swept away with them as part of the ejecta. This powder is a pure form of a mineral called "cryolite" and is processed for its aluminum content when found in naturally occurring mineral deposits.

In accordance with the present invention, a neutralizing substance is injected into the exit planes of a laser system, for example, the exit planes of each of the twenty ejectors making up a THEL ejector pump system. The neutralizer choice must insure that the reaction with the DF and HF proceeds to completion and that the reaction products are non-toxic and are stable in the high temperature environment at the ejector plane. As used herein, "insoluble" means having a solubility of not more than about 0.042 grams dissolved in 100 grams of water at 25° C. "Non-toxic" means that it is not carried as a toxic material in industrial toxicity manuals. Furthermore, the material is insoluble in HCl, and therefore not subject to breakdown after accidental ingestion. The word "neutralized" means leaving the gas stream depleted of its acid content such that the condensate would have a pH in excess of 6.

In an important aspect of the invention, neutralizer is selected such that the reaction product of neutralizer and HF and DF is a complex fluoride. Most complex fluorides are insoluble and as used herein, "complex" means a fluoride atom bound to some combination of metals, oxygen or similar atoms such that complex has a solubility in water of less than about 0.05 grams in 100 grams $H^2O$ at 25° C. In a very important aspect, the reaction product is a cryolite. Cryolite, $(Na_3AlF_6)$ is insoluble, at least in nearly neutral solutions, and more importantly, can't be made to give up its fluorine without some sort of electrolysis process operating on the melt. Therefore the fluorine atoms remain sequestered.

In an important aspect of the invention, the neutralizer can be created by reacting aluminum with sodium hydroxide according to the following amphoteric reaction:

$$Al + 3NaOH \rightarrow Na_3AlO_3 + \frac{3}{2}H_2$$

Sodium aluminate in the presence of water hydrolyzes, so that it is equally useful to think of it as a mixture of aluminum and sodium hydroxides. In any case, one aluminum atom sequesters six fluorine atoms in the neutralization reaction either with the neutralizer considered a mixture of aluminum and sodium hydroxide or as sodium aluminate. As shown in the following reactions, one aluminum atom sequesters six fluorine atoms in the neutralization reaction that occurs with either aluminum hydroxide or with trisodium aluminate.

$$Al(OH)_3 + 6HF(DF) + 3NaOH \rightarrow Na_3AlF_6\downarrow + 6H_2O(6HDO)Na_3AlO_3 + 6HF(DF) \rightarrow Na_3AlF_6\downarrow + 3H_2O(3D_2O)$$

Aluminum hydroxide dissolves in acids and bases, but forms a flocculent precipitate in water. In a strong base aluminum hydroxide reacts (as an acid—aluminic acid) to eliminate water. For our purposes, a solution prepared in a 3:1 mol ratio contains the hydroxide, the salt and base. In any case, a fluorine atom easily displaces both the hydroxide and oxide groups attached to the aluminum to yield sodium hexafluoroaluminate which is insoluble in water and has a melting temperature of 1009° C. Hence, one mole equivalent of the intermediate compound $Na_3AlO_3.3H_2O$ will neutralize six DF (HF) mols. Because sodium hexafluoroaluminate is insoluble and has no appreciable vapor pressure at the post ejector temperature (710 deg. K), the reaction goes to completion probably even in the presence of the competing sodium fluoride because the later is slightly soluble.

Importantly, the desired cryolite is the final product no matter whether the HF or DF reacts with aluminum hydroxide or trisodium aluminate. In the first reaction, it may be assumed that some of the acid will react with sodium hydroxide, but the latter simple fluoride salt partially hydrolyses and therefore the product will disproportionate contributing to cryolite production eventually sequestering all of the fluorine atoms.

As shown in FIG. 1, neutralizer is dispensed from a spray head (10) located in interstitial areas (20) between ejector nozzles (30). The interstitial areas between ejector nozzles commonly have an area of about 1.5 to about 2.0 ft². Spray heads are those commonly available in the art, for example fog nozzles, available from Bete Fog Nozzle, Inc. of Greenfield, Mass. In an important aspect, each spray head is capable of delivering neutralizer at a rate of about 250 cm³/sec to about 300 cm³/sec and for providing the neutralizer in droplets having a diameter of from about 50 μm to about 100 μm, and preferably about 50 μm.

The smaller the droplet, the greater surface area to volume ratio. The reaction with DF depends on exposed surface area of the droplet or crystal and the more finely divided the end result, the most efficient neutralization results. As used herein, "efficiency" is the ratio of reacted neutralizer to total neutralizer injected per second. In an important aspect, the present invention is capable of providing an efficiency of about 80% to about 100% depending on the flow rate. The expected high efficiency of the system is proven in Example II by showing that 99% of the acid is neutralized if the average neutralizer particle diameter is 0.2 micron. If, on the other hand, experimental results showed that it is less, then increasing the reservoir pressure can remedy the problem by injecting a stoichiometric excess of neutralizer.

In an important aspect of the invention, it is very desirable that the resultant sodium hexafluoroaluminate particles remain at very small sizes, say less than about 0.5 micron. At a size of less than about 0.5 micron the effect on the plume visibility is negligible.

If either the reservoir size, overpressure or neutralization efficiency is a problem, increases in neutralizer concentration or the number of atomizer heads as needed to conform to pressure, volume and neutralization efficiency requirements can be made.

In another important aspect of the invention, each spray head (10) includes eight atomizer nozzles (40). A typical laser system will include twelve interstitial areas, hence, a total of 96 atomizer nozzles will be utilized. In this aspect of the invention, each nozzle must dispense 1/96 of the total neutralizer load or 0.227 mol/sec of neutralizer.

In another aspect of the invention, each atomizer nozzle (40) is surrounded by an insulating collar (50). The insulating collar can be any type of insulating material known in the art, including for example polyvynal chloride. The insulating collar (50) is effective for preventing premature boiling of the neutralizer substance prior to its being dispensed.

Figure 2:
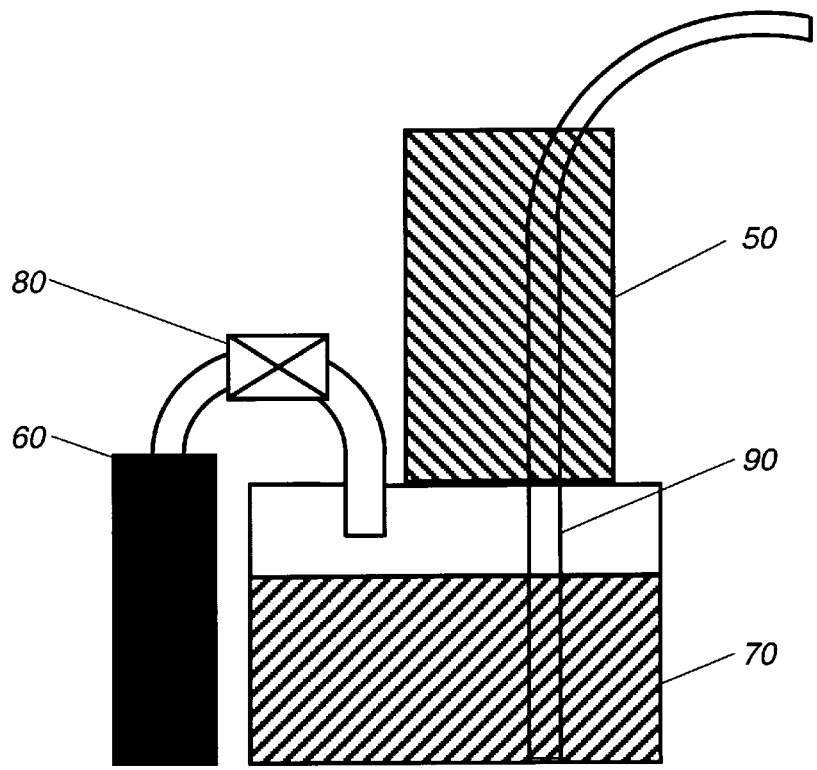
FIG. 2 shows a pressurized reservoir supply for the atomizer nozzles (only one of the 96 is shown for simplicity).
Figure 3:
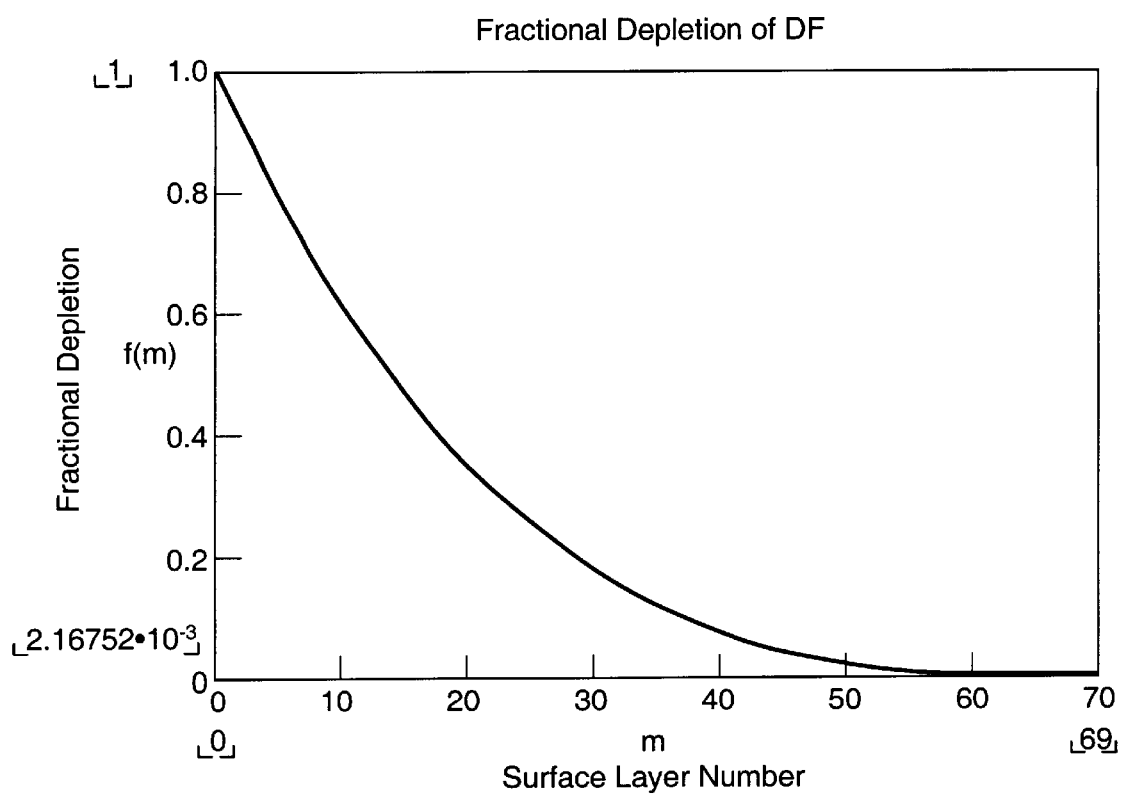
FIG. 3 graphically illustrates fractional depletion of DF by graphing fractional depletion versus surface layer number.

FIG. 2 shows the atomizer nozzle feed system. As shown in FIG. 2 a gas supply (60) pressurizes neutralizer reservoir (70). The gas supply (60) may be a separate gas supply or a simple bleed from the existing helium supply. When a separate gas supply is utilized, the gas may be helium, $N_2$ or air. The amount of pressure supplied to neutralizer reservoir (70) is controlled by pressure regulator (80). The neutralizer reservoir (70) is of a size sufficient to contain a convenient amount of neutralizer solution but not so large as to add significantly to the size of the system. There is one reservoir per system with a backup supply of reactants available at a fuel depot. When the laser weapon is refueled, the reservoir is to be refilled. In an important aspect, the neutralizer reservoir (70) is of a size sufficient to hold from about 640 to about 700 liters of neutralizer solution.

As further shown in FIG. 2, a feed tube (90) extends from the neutralizer reservoir to each atomizer nozzle (40). Feed tubes (90) may be those known in the art, such as those available from plumbing supply houses. Each feed tube is also surrounded by a insulating collar (50) which extends over the length of the feed tube (90) and over the atomizer nozzle (40). In a typical system feed tubes will have an inside diameter of about 1.25" and a length of about 5' to about 25'.

The concentration of the neutralizer determines the reservoir size. In an important aspect of the invention, neutralizer has a concentration of from about 1.0 to about 2 molal. In a very important aspect, a 1.0 molal solution of the neutralizer is easily prepared and is stable. Higher concentrations reduce the reservoir size; however that advantage must be traded off against possible crystallization and plugging in the feed system. The latter is hard to compute unless the feed line layout is well-known since the outcome depends on how hot the solution becomes on its trip from the reservoir to the nozzle tip.

In an important aspect of the invention, the neutralizer composition is a 1.0 molal solution consisting of 198 grams of $Na_3AlO_3.3H_2O$ (equivalent) in 802 grams of water. The solution density, based upon the mol fraction of the solute is estimated to be 1.027 grams. Therefore each nozzle must deliver 0.227 mols/sec of solute or equivalently a volume flow rate, $V_1=221.3$ cm³ of solution to the ejector flow each second.

The following example illustrates the invention and should be understood to be illustrative of, but not limiting upon, the scope of the invention which is defined in the appended claims.

EXAMPLE I

The following formulas provide a basis for calculating operating parameters. For purposes of this example, a 1.0 molal solution is utilized and the following properties associated with the THEL ejector system are utilized.

| | |
|---|---|
| 1. Total mass flow | 110 Kg/sec |
| 2. Mass fraction, DF | 2.5% |
| 3. Average flow diameter | 1.6 m |
| 4. Flow collimation length | 10 diameters |
| 5. Flow speed | 130 m/sec |
| 6. Flow temperature | 710 K |
| 7. Average fluid molecular weight | 17 g/mol |

The following empirical formula (M. L. Green, *Particulate Clouds, Dust Smokes and Mists*, D. Van Nostrand, Inc. Toronto (1964), p. 40) relates the relative air $V_a$ and liquid $V_3$ speeds (m/sec), the liquid surface tension y: the liquid density p; and the ratio of volume to surface of the produced aerosol droplet, d (microns).

$$d = \frac{585}{(v_a - v_1)} \left(\frac{y}{p}\right)^{1/2} \text{ microns}$$

This formula valid for $v_a > v_1$ holds true in the present invention. Where droplets are desired with a 50 microns in radius the formula can be inverted to find the atomizer nozzle area that yields this sort of spray since;

$$V_1 = \frac{V_1}{100 A_m}; \text{m/sec.}$$

If d=(4/3) 50 microns (d is the ratio of a volume to an area); using an air flow velocity of 130 m/sec; and the required volume flow rate, the following equation is derived for the atomizer nozzle radius as a function of the droplet surface tension;

$$r(y) = \left[\frac{0.704}{130 - 8.65 y^{1/2}}\right]^{1/2}$$

The droplet surface tension is not known, but based upon the fact that the 1.0 molal solution is mostly water, we assume the surface tension in water at 100° C.; 58 dynes/cm. Hence $r_n$=1.05 mm and $v_1$=130−8.65 $y^{1/2}$=54 m/sec. Moreover the initial spray stream makes an angle of 22 degrees with respect to the stream flow insuring that the spray will be entrained in the ejector flow.

The reservoir must be pumped to a pressure;

$$P = \frac{10^4}{2} p v_1^2 = 14.97 \times 10^6 \text{dynes/cm}^2$$

or about 15 atmospheres (post ejector plenum is at atmospheric pressure) to deliver the required flow rate.

Based upon the concentration of the neutralizer, the reservoir must accommodate 159 gallons of fluid assuming (roughly) 4 liters to the gallon and a 30 second run time.

It will be impossible for the droplet particle to remain the same size as it is carried along with the exhaust. First, the difference in air and liquid velocity will cause the droplet to splash in the air flow; and secondly explosive heating in the 700K air-flow will reduce the droplet to even smaller sizes. The critical diameter $d_c$ at which surface tension will hold together a water drop in a differential flow field is given by an empirical formula (M. L. Green, *Particulate Clouds, Dust Smokes and Mists*, D. Van Nostrand, Inc. Toronto (1964), p. 39):

$$d_c = \frac{6.12 \cdot 10^3}{(v_a - v_1)^2} = 1.06 \text{ microns}$$

Essentially the drop "splashes" as it is introduced into the ejector air stream. According to this formula, droplets formed according to the present invention are within a factor of 5 of the desired droplet radius.

EXAMPLE II

The following Example provides proof that if the neutralizer particle size is 0.1 micron or less, 99% of the acid will be neutralized during the collimated flow length.

We appeal to the basic concepts of Brownian motion; specifically to Smoluchowskil's approach (*Noise and Stochastic Processes*, Nelson Wax, ed., Dover Publ. New York, 1954). Assume a gas consisting of DF molecules and diluent into which is suspended the neutralizer particles. Around each neutralizer particle is a volume, radius R' in which it is assumed that if a DF molecule center wanders into this volume, the neutralizer particle reacts with it, removing it from the system. Further let $N_{OF}$ be the number of DF molecules per cm$^3$:D, the diffusion coefficient, and Q, the DF disappearance rate. Then Smoluchowski showed that Q is related to the other variables by;

$$Q = 4 \pi D R' n_{DF}$$

Q is the disappearance rate for one neutralizer particle; but there are N of them per cubic centimeter, therefore the total rate of change for the DF concentration is;

$$-\frac{d n_{DF}}{dt} = NQ = 4\pi D R' N n_{DF}$$

There are several assumptions in this model; (a), the aspirated neutralizer droplets are instantly splashed into their final sizes; (b), the small pieces are carried along the flowing stream leaving no net motion between the neutralizer particles and the flow stream; (c), the neutralizer particles do not coagulate.

The previous equation is simple exponential since the dependence on $n_{OF}$ is explicit. Accordingly it may be solved trivially. Suppose we require that the DF concentration at the end of the collimated flow regime (0.123 seconds) is 1% of the initial concentration; e.g., we remove 99% of the acid. It follows that the time constant t=0.02671 seconds; therefore;

$$t^{-1} = \frac{1}{0.02671} = 4\pi D R' N$$

We anticipate that the neutralizer particle size will be much larger than a molecular diameter, hence R'=R, the particle radius; moreover Hirshfelder, Curtiss and Bird (Hirshfelder et al., *The Molecular Theory of Gases and Liquids*, John Wiley and Sons, New York, 1954, p. 14) give an expression for the binary diffusion coefficient in a gas at pressure P and temperature T, that simplifies for a large and small particle to:

$$D = \frac{4 \cdot 2.628 \cdot 10^{-19}}{R^2 P} \sqrt{\frac{T^3}{2M_{DF}}}, \text{cm/sec}$$

Combining the previous two equations at P=1 atmosphere, we find a constraint on the ratio of N/R;

$$\frac{N}{R} = 9.474 \cdot 10^{14}$$

On the other hand, the required particle density is the ratio of the liquid volume sprayed into the flow stream divided by product of the total volume swept out during that same period times the volume of a neutralizer particle;

$$N = \frac{96 \cdot 221.3 \cdot 3}{\pi (80)^2 \cdot 13000 \cdot 4 \pi R^3} = \frac{1.94 \cdot 10^{-5}}{R^3}$$

Thus, the particle radius R satisfying the previous two equations is 0.1196 microns, proving the contention.

EXAMPLE III

The following equation describes a device and process of the invention where neutralizer droplet substance is a 1.0 molal solution of the neutralizer candidate; hydrated trisodium aluminate.

The droplets are born from a 100 micron diameter thread of liquid emerging from 2.10 mm diameter nozzle heads and rapidly reduced to 0.2 micron diameter droplets by the differential flow between the ambient 130 m/sec flow and the nozzle flow rate. While these droplets react with the acid in the flow during the water evaporation phase, the reactions only take place after all the water has evaporated, producing longer reaction times.

While not intending to be bound by any theory, the solid phase/acid reaction takes place in three steps (shrinking core model):

(a) surface molecules of the reactant take up acid until the surface is covered with cryolite;

(b) the surface layer flakes off exposing fresh reactant; and (c) this process continues until there is no more reactant left.

There are three time scales to consider in relation to the total 'confinement time' said to be about 123 milliseconds (the confinement time is the time the flow moving at 130 meters a second sweeps out about 16 ejector diameters. During this phase, the flow is essentially collimated and not engulfing ambient air.) These are (1) the time for droplet breakup; (2) time for droplet evaporation to a dry core, (3) and time for the dry core to completely react with the acid present according to the "shrinking core" model. Estimates of the latter two times and assume that the droplet breakup process is completed in about a meter of travel (about 7 milliseconds). The following table summarizes the results:

| Event | Time |
|---|---|
| Flow breakup | 7 ms |
| Droplet Evaporation | 1.3 $\mu s$ |
| Particle reaction | 27 $\mu s$ |

It is clear from the table that there is plenty of margin for error an still meet the 123 millisecond goal.

For purposes of this example, the following flow properties associated with the THEL ejector system are utilized.

| | |
|---|---|
| 1. Total mass flow | 110 Kg/sec |
| 2. Mass fraction, DF | 2.5% |
| 3. Average flow diameter | 1.6 m |
| 4. Flow collimation length | 10 diameters |
| 5. Flow speed | 130 m/sec |
| 6. Flow temperature | 710 K |
| 7. Average fluid molecular weight | 17 g/mol |
| 8. Pressure (1 atm.) | $1.016 \times 10^6$ dynes/cm$^2$ |
| 9. Flow volume swept out in 1 sec | $2.614 \times 10^8$ cm$^3$ |

From these figures the average concentration of DF, expressed in #/cm$^3$, is:

$$n_{\cdot DF} = \frac{M_{DF} 1000 N_{avo}}{MW_{DF} V_e} = 3.018 \times 10^{17}$$

Here $N_{avo}=6.023\times10^{23}$ (Avogadro's number) and $V_e$ is the flow volume swept out in one second. A neutralizer concentration equal to ⅙ this value needs to be supplied according to the stoichiometry shown in the following equation.

$$Na_3AlO_3 + 6HF(DF) \rightarrow Na_3AlF_6 \downarrow + 3H_2O(3D_2O)$$

Accordingly supply should be at least;

$$M_{neut} = \frac{1}{6} M_{DF} \frac{MW_{neut}}{MW_{DF}} = 4.32 \text{kg/sec.}$$

In this formula and below, the molecular weights are $MW_{neut}$=197.914, and $MW_{DF}$=20.998 grams, respectively.

The neutralizer fluid flow rate for the assumed 1 molal neutralizer concentration is determined as follows. First, determine the number of moles of $H_2O$ in 1000 grams of solution:

$$m_{H_2O} = \frac{1000 - 1 \cdot MW_{neut}}{MW_{H2O}} = 44.52$$

and the assumed neutralizer density, $P_{neut}$=2.244 gms/cm$_3$ to determine the average density and average molecular weight of the neutralizer fluid:

$$p_{av} = \frac{m_{H_2O}}{1 + m_{H_2O}} + \frac{1}{1 + m_{H_2O}} P_{neut}$$

$$MW_{av} = \frac{m_{H_2O}}{1 + m_{H_2O}} MW_{H_2O} + \frac{1}{1 + m_{H_2O}} MW_{neut}$$

As seen from these formulae, the neutralizer makes up about 2.2 mole per cent of the neutralizer liquid.

The solution flow rate thus is the fraction $1000/MW_{neut}$ times the neutralizer flow rate given above;

$$M_{sol} = \frac{1000}{MW_{neut}} M_{neut}$$

and, therefore the liquid flow rate is;

$$V_{liq} = \frac{1000 M_{sol}}{P_{av}} \varepsilon = 2.167 \times 10^4 \text{cm}^3/\text{sec}.$$

$\varepsilon$ is a number equal or greater than 1 and represents the excess neutralizer needed to either account for imperfect product flaking off the core or to bring the DF concentration down faster to some prescribed level. Later analysis shows that the acid level can be reduced to about 0.2% of its initial value where $\varepsilon$ is 1.02.

If $r_0$ represents the droplet radius then the number of such droplets in a cubic centimeter of flow is (#/cm$_3$);

$$N_p = 3 \frac{V_{liq}}{4\pi r_0^3 V_e} = 1.979 \cdot 10^{10}$$

As a check to see if enough neutralizer molecules are provided (#/cm$_3$):

$$n_{neut} = \frac{N_p P_{av} N_{avo} 4\pi r_0^3}{3 MW_{av}(1+M_{H_2O})} = 5.13 \cdot 10^{16}$$

We see that this number is about 2% larger than $\frac{1}{6}$-th of the initial DF concentration.

The water molecule concentration, not counting evolved water, is $$n_{H_2O} = \frac{\frac{P_{av} - MW_{neut}}{N_{avo}} n_{neut}}{m_{H_2O}} \cdot N_p \cdot \frac{4\pi r_0^3}{3} = 2.848 \cdot 10^{18};$$

which adds about 10% to the number density of the ejected gases.

The dry radius, $r_s$ of the evaporated droplet, given that $m_{neut} = MW_{neut}/N_{avo}$;

$$r_s = \left(\frac{3 n_{neut} m_{neut}}{4\pi N_p P_{neut}}\right) = 4.491 \cdot 10^{-6} \text{cm}$$

Hence the droplet shrinks to less than half its original size while drying out.

As the water evaporates from the droplet, its density changes from that of the solution to the solid neutralizer. Extrapolation between the two densities as a function of radius is possible according to the following assumed equation:

$$u = \frac{r}{r_s};$$

$$p(u) = p_{av} \frac{u-1}{\left(\frac{r_0}{r_s} - 1\right)} + p_{neut} \frac{\left(\frac{r_0}{r_s} - u\right)}{\left(\frac{r_0}{r_s} - 1\right)}$$

After defining a diffusion coefficient, a mean speed, a mean free path and a weighted mean free path, Fuchs's equation (Hirshfelder et al., *Molecular Theory of Gases and Liquids*, John Wiley and Sons, New York, 2nd Ed. 1964, p. 12–13) is solved for the droplet evaporation time. A major assumption is that these particles are thrust into a very hot environment and that the input heat diffusion rate equals the rate heat is carried away from the particle resulting in a stable boiling temperatures of 373 deg. K until the water is gone. Therefore this model assumes a cloud of vapor surrounds the particle, shielding it from the ambient high temperature and mediating heat transfer to and from the particle. One assumption is that the diffusion and other properties have values at the surface temperature. Boiling point elevation has not been accounted for as the droplet becomes enriched in the solute, however, such a correction modifies our estimate insignificantly. Particle dimension becomes comparable to a mean free path; raising a question whether diffusion theory is applicable. However, Fuchs's equation below accounts for that by introducing the mean free path in such a way that the evaporation rate doesn't go to infinity as the particle radius goes to zero.

Following is a series of definitions needed for Fuchs's equation;

A. Diffusion coefficient[3]

$$D(T) = \frac{3}{8}\left(\frac{m_{H_2O} kT}{\pi}\right)^{1/2} \left(\frac{kT}{\sigma_{H_2O}^2 m_{H_2O} P}\right) D(373) = 0.658 \text{cm}^2/\text{sec}.$$

B. Mean speed;

$$v(T) = \left(\frac{kT}{2\pi m_{H_2O}}\right) v(373) = 1.655 \cdot 10^4 \text{cm/sec}.$$

C. Mean Free Path;

$$\lambda(t) = \frac{kT}{\sqrt{2} P \pi \sigma_{H_2O}^2} \lambda(373) = 1.687 \cdot 10^{-5} \text{cm}.$$

D. Weighted Mean Free Path;

$$\Delta(T) = \left(\frac{m_{H_2O} + m_{gas}}{m_{H_2O}}\right)^{1/2} \Delta(T) = 1.43 \lambda(T)$$

Here k is Boltzmann's constant, $k=1.38 \times 10^{-15}$ ergs/deg; $m_{gas}$ is 'gas' molecule hypothetical mass obtained by dividing the gas average molecular weight by Avogadro's number (see Table above). The molecular water diameter was taken as 2.6 angstroms.

In accordance with the invention, a droplet begins losing weight at the very instant it is created in the flowing gas, temperature T=710 deg. Let the vapor concentration at a distance $r+\Delta(T)$ be $n_1$ molecules per cubic centimeter less than the saturation concentration $n_{sat}$.

The evaporation rate into a vacuum is $4\pi r^2 v(T) \alpha n_{sat}$ molecules per second, where $\alpha$ is the evaporation coefficient; the fraction of molecules striking the surface which condense. Hence the arrival rate of molecules at the surface of a shell $r=\Delta(T)$ distant from the droplet center is $4\pi r^2 v(T) \alpha (n_{sat} - n_{H_2O})$. Equating this to the rate at which molecules leave by diffusion, assuming steady state:

$$n_{H_2O}([r+\Delta(T)]D(T) + r^2 v(T)\alpha = n_{sat} r^2 v(T) \alpha,$$

and therefore the rate of mass loss is given by Fuchs's equation;

$$-\frac{dm}{dt}=\frac{4\pi r^2 D(T) m_{H_2O} n_{sat}(T)}{\frac{D(T)}{v(T)\alpha}+\frac{r^2}{r+\Delta(T)}}$$

The saturation water vapor pressure is clearly 1 atmosphere at 373 degrees from which $n_{sat}$ can be computed. After defining m as the product of the spherical particle volume, radius r and the density of the particle as a function of r, the integration is readily performed for r varying between $r_O$ and $r_s$. The result is $$T_{evap}=\frac{1.3398 p_{av} r_s}{m_{H_2O} n_{sat}(373) v(373)\alpha}=1.265\cdot 10^{-6}\text{sec.}$$

The coefficient α becomes very small if there is some sort of insoluble monolayer that inhibits evaporation. Arbitrarily for purposes of this example, it is equal to 0.5 to represent the effect of the increasing solute concentration as evaporation progresses.

The density and molecular weight of the neutralizer solid is known, and therefore it is a simple matter to compute the molecular diameter according to:

$$\sigma_{neut}=2\left(\frac{3MW_{neut}}{4\pi p_{neut} N_{avo}}\right)^{1/3}=6.54\cdot 10^{-8}\text{cm.}$$

Accordingly, then there must be $$M_{max}=Int\left[\frac{r_s}{\sigma_{neut}}\right]=69$$

concentric shells of neutralizer. Now there are $N_p$ particles per cubic centimeter, because even though all the particles lost water, none of them were destroyed by the evaporation process. Each surface molecule reacts with 6 molecules of acid; therefore reacting the first layers with the ambient will reduce the ambient acid concentration then by:

$$n_1=n_0-144N_p\left(\frac{r_s}{\sigma_{neut}}\right)^2;$$

where the n's represent the ambient acid concentration in number of molecules per cubic centimeter. The factor on the right is the ratio of the surface volume divided by the particle volume=number of surface particles; and the numerical factor is the product of 6 times 8 where the 6 arises because 6 DF molecules are lost for every reactant molecule gone; the factor 8 comes from 2 cubed, and the factor 3 arises in the ratio of a surface area divided by a volume.

Similarly after the first layer is used up, we have;

$$n_2=n_1-144N_p\left(\frac{r_s-\sigma_{neut}}{\sigma_{neut}}\right)^2,$$

and so on. We then sum all the terms and make use of the known values for finite sums of integers and integer squares to yield the final result. In this equation, F is defined to be the fraction of the DF concentration remaining after the m-th layer has reacted.

$$F(M)=1-144\varepsilon N_p\frac{\left(\frac{r_s}{\sigma_{neut}}\right)^2}{n_{DF}}\cdot m\cdot\left[1-\frac{\sigma_{neut}}{r_s}(m+1)+\frac{1}{6}\left(\frac{\sigma_{neut}}{r_s}\right)^2(m+1)(2m+1)\right]$$

The fractional depletion of DF is shown graphically in FIG. 3. As shown in FIG. 3, DF depletion is about 50% complete after about the 15th layer reacted Note the inclusion of ε, defined earlier. If its value were one, then the curve asymptotes to a small but finite value corresponding to the fact that the very small pits are very inefficient reacting with ambient DF. Hence by increasing the particle density slightly, the DF concentration can be brought down to any desired level.

It is easy to compute the time for these steps; in fact its value is proportional to the total number of layers:

$$t_{max}(M_{max})=\frac{144M_{max}}{4\pi v(T) n_{DF}\sigma_{neut}^2}=26.833\cdot 10^{-6}\text{secs.}$$

Thus analysis establishes the evaporation and reaction times for the dispensed neutralizer. It is quite evident that the proposed system is robust because factors of 2 or even an order of magnitude in the times estimates can be accommodated. Moreover, if the shrinking core mechanism is not efficient, then it is a simple matter to increase the neutralizer concentration in the fluid since at present it makes up only about 2.2 mole percent of the solution.

What is claimed and desired to be covered by a Letters Patent is as follows:

1. A method for treating exhaust gases from a laser system comprising:

(a) preparing a neutralizer by reacting aluminum and sodium hydroxide in an aqueous medium at temperature less than the boiling point of the aqueous medium, and (b) injecting the neutralizer of step (a) into the exhaust gases generated by the laser as droplets having a diameter of 100 micron or less and in an amount effective for reacting with hydrogen flouride and deuterium flouride in the exhaust gases to form an insoluble powder.

2. The method of claim 1 wherein the neutralizer is injected at a rate of 223 $cm^3$/sec per nozzle.

3. The method of claim 1 comprising injecting the neutralizer into an interstitial area between laser ejector nozzles.

4. The method of claim 1 wherein the insoluble powder is a complex fluoride.

5. The method of claim 4 wherein the complex fluoride is a cryolite.

* * * * *